H. F. WEISS.
RECOVERY OF ORGANIC PRODUCTS FROM WOOD.
APPLICATION FILED AUG. 11, 1917. RENEWED OCT. 21, 1919.
1,339,489.
Patented May 11, 1920.
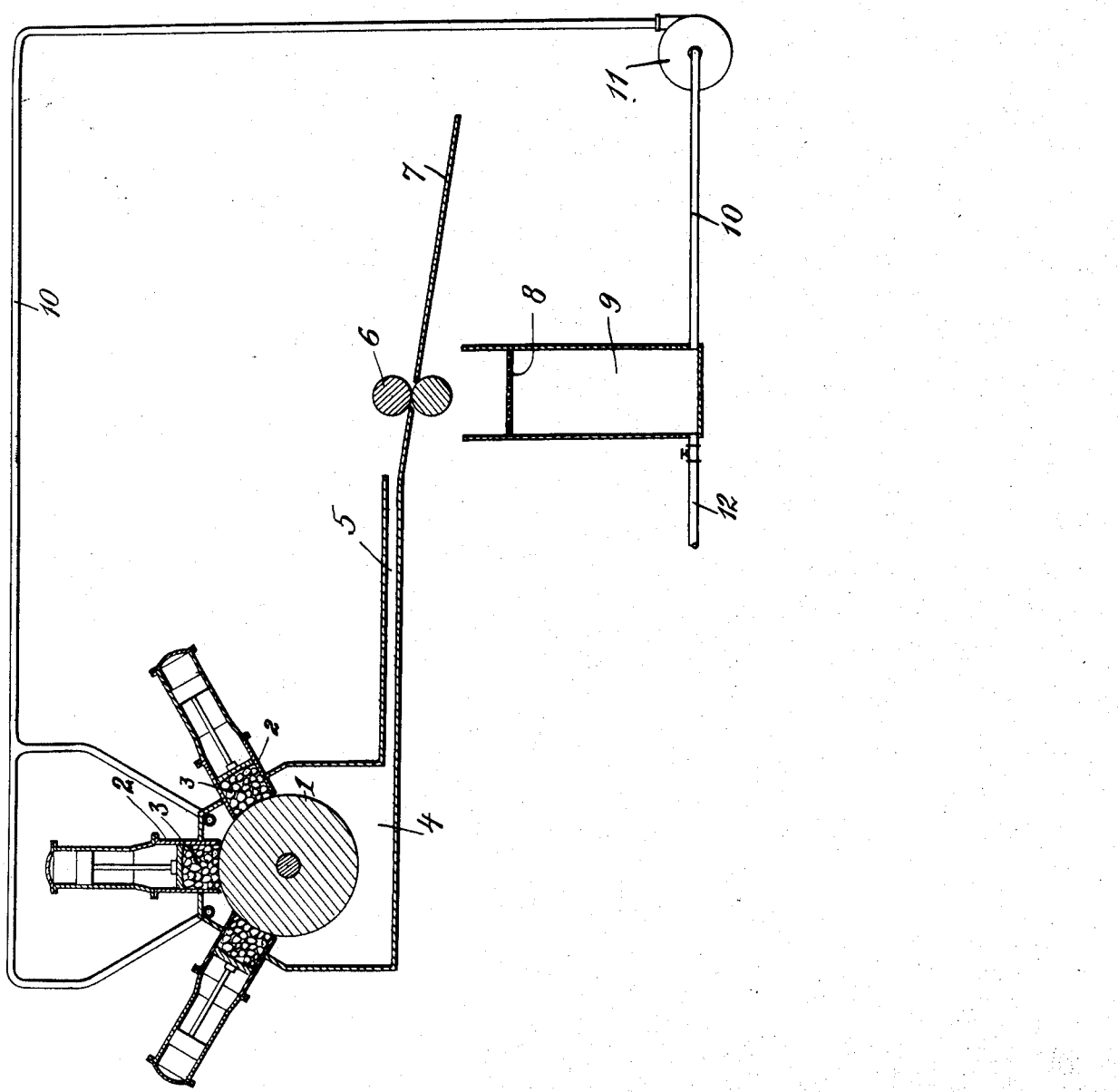

UNITED STATES PATENT OFFICE.

HOWARD F. WEISS, OF MADISON, WISCONSIN, ASSIGNOR TO C. F. BURGESS LABORATORIES, OF MADISON, WISCONSIN, A CORPORATION OF WISCONSIN.

RECOVERY OF ORGANIC PRODUCTS FROM WOOD.

1,339,489.  Specification of Letters Patent.  Patented May 11, 1920.

Application filed August 11, 1917, Serial No. 185,639. Renewed October 21, 1919. Serial No. 332,251.

*To all whom it may concern:*

Be it known that I, HOWARD F. WEISS, a citizen of the United States, residing at Madison, in the county of Dane, State of Wisconsin, have invented certain new and useful Improvements in the Recovery of Organic Products from Wood; and I do hereby declare the following to be a full, clear, and exact description of the invention, such as will enable others skilled in the art to which it appertains to make and use the same.

This invention relates to the recovery of various organic products such as sugar, alcohol, galactan, and other carbohydrates, acetic acid, etc. from wood, and more particularly from the waste waters of the mechanical wood pulp grinding operation.

In the production of ground wood pulp by grinding the wood with the usual grindstone, a considerable amount of water is commonly run over the stone to promote the grinding operation and to carry away the resulting pulp. The amount of this water amounts to, for example, 40,000 pounds per ton of pulp produced by the grinding process. This water, which is freely circulated over the grindstone during the grinding operation, is commonly run to waste after the separation of the pulp therefrom.

According to the present invention, the water used in the grinding operation is recovered after separation of the pulp therefrom and recirculated over the grinder. This water, thus separated from the pulp, contains extremely finely ground wood which passes through the screens or other devices used for the separation of the pulp, together with small amounts of various organic products, such as sugars, resins, tannins, acids, etc. The amounts of materials thus carried by the water in the usual grinding operation are very small; but by re-circulating the water over the grinder, the amount of such substances is progressively increased, and the concentration thereof can be thus raised to such a degree as to make possible the utilization of the resulting water for recovery of various organic products contained therein or produced therefrom.

The nature and amount of the various substances which are liberated from the wood during the grinding operation, or which are extracted or separated during this operation, will depend largely upon the species of wood undergoing treatment, and the manner in which the wood has been preliminarily treated or prepared. The wood may thus with advantage be subjected to a preliminary steaming or boiling and the thus preliminarily treated wood subjected to the grinding operation for the production of wood pulp with accompanying extractions of the soluble or liberated constituents, so that, upon re-circulation of the water, correspondingly increased or modified recoveries will result. The production of the pulp from the preliminarily treated wood will be correspondingly improved or modified.

In the carrying out of the invention, the water may be circulated over the grindstone, or its equivalent, in the usual manner and subsequently separated from the resulting pulp by common and familiar means, for example, by first passing the pulp through a screen to remove the slivers and then through a squeeze-roll to remove the water. The water thus removed is, according to the present invention, re-circulated over the grinder and thus utilized in a series of successive grinding operations, so that its content of extracted and contained products is progressively increased.

This re-circulation of the liquor, with resulting increase in concentration and contained products, can be continued until the desired concentration has been reached or until such a concentration has been reached that the further circulation becomes undesirable. If the concentration becomes too great, there will be a tendency for the liquor to gum up the grinder and pipes and to decrease the amount of additional products extracted or recovered from the wood being ground; also, much of the liquor goes to waste by adhering to the pulp after it passes through the squeeze rolls. Too great an increase in concentration may thus be prejudicial to the grinding operation and may likewise involve a loss in recoverable substances which would be extracted or recovered with a less concentrated liquor. There will accordingly, in practice, be an upper limit to the concentration, based on such considerations as those mentioned, as well as a minimum concentration which will enable satisfactory recovery of the products to be effected. The recirculation of the liquor will usually be continued until it has been brought to a maximum of concentration consistent with absence of prejudicial effect upon the further grinding and extraction operation; or until it has been brought to the concentration best adapted for subsequent treatment and recovery of contained substances.

When the liquor has thus been brought to the desired concentration, it is drawn off so that it is no longer circulated and is then subjected to further treatment for the recovery of the substances contained therein. This liquor may be thus evaporated, with or without preliminary treatment, and its contained substances thereby recovered in a more concentrated or in a solid form. So also, the liquor may be subjected, with or without preliminary treatment, to distillation for the recovery of volatile constituents therefrom, and evaporation effected either simultaneously or subsequently, or the liquor otherwise treated after the distillation.

Again the liquor, with or without further treatment or concentration, may be run into vats and subjected to fermentation in order to produce alcohol from the fermentable constituents thereof. The amount of fermentable sugar contained in the liquor can be increased by boiling the liquor with a weak acid, for example with a 4% solution of sulfuric acid, and then neutralizing with lime and subsequently subjecting the liquor to fermentation. Where the liquor resulting from the recirculation above described is to be fermented without treatment with acid, any contained acid may likewise be neutralized before the fermentation operation. So also, before the fermentation, the liquor can be subjected to a slight evaporation or concentration to remove the more volatile constituents or to increase the concentration, or the liquor may be preliminarily purified for the removal of any constituents prejudicial to the fermentation.

A particularly valuable embodiment of the invention involves the recovery of galactan from the wood of the western larch; and the recovery of accompanying constituents or of constituents which are themselves obtainable from the recovered galactan. In the grinding and comminuting of the wood of the western larch, the galactan contained therein is to a very great extent liberated so that it can be freed with comparative ease from the wood tissues or substances with which it is associated. The amount of extracted and suspended material may thus amount to as much as 600 pounds per ton of larch, if the wood is unsteamed, and as much as 850 pounds, if the wood has first been steamed. If, for example, 40,000 pounds of water are used in grinding one ton of larch, the amount of material in solution and suspension will be distributed throughout such an amount of water. By recovery and recirculation of this water, during the grinding of further amounts of wood, the amount of extracted material can be very considerably increased.

When the re-circulated water has been brought to the proper or desired concentration, it may be filtered and evaporated to dryness, and the galactan then recovered from the dry product; or the galactan may be converted into galactose, as by treatment with dilute sulfuric acid, and the galactose thus produced evaporated and recovered in the form of a syrup, etc. The galactan produced therefrom may, by treatment with nitric acid, be converted into mucic acid.

The liquor obtained as above described from the wood of the western larch can likewise be subjected to fermentation, after preliminary concentration, or purification, or other treatment, and fermentable constituents thereby converted into alcohol which can be subsequently recovered by distillation.

When the liquor containing the recovered substances is, without further treatment, resistant to fermentation, or where the content of fermentable substances is too low for effective fermentation, the liquor can be concentrated, or otherwise treated, to increase the concentration of fermentable sugars, or for the production of further amounts of such sugars therein, or for the separation of such ingredients as are prejudicial to the fermentation. The content of fermentable sugars can be thus increased in the liquor by boiling with dilute acid and thereby converting suspended constituents of the liquor into sugars, as above pointed out.

In carrying out the fermentation, the yeast or ferment can be gradually acclimated to the liquor or medium to be fermented, in case such acclimating is necessary or desirable for the promotion of the fermentation. Yeasts which are acclimated to other media may thus require to be gradually accustomed or acclimated to the new medium for their best propagation therein.

The invention will be further described in connection with the accompanying drawing, which illustrates, conventionally and in diagram, an arrangement of apparatus adapted for the carrying out of the invention and the production of a concentrated liquor, such as above described, available for use in the further practising of the process of the invention.

In the accompanying drawing, a grindstone is shown conventionally or diagrammatically at 1 provided with the usual pockets 2 containing the wood 3 to be ground, this wood being pressed against the stone in any suitable manner. The water circulated over the grinder carries with it the pulp produced and flows through the grinder pit 4 and the conduit 5 to the squeeze-rolls 6 where the liquor is pressed from the pulp. It will be understood that the squeeze-rolls illustrated are typical of the devices which are available for the separation of the pulp and liquor and that other equivalent separating devices, such as centrifugal screens or presses, will subserve the same ends. It will be understood also, that the relative arrangement of the grinder and dehydrating device is not of importance and that the recovery of splinters may be effected in the usual manner by the screens or other devices (not shown) before the pulp is dehydrated. The pulp, after removal of the liquor therefrom, passes off on the apron 7 to the pulp working machinery where it can be handled in the usual way. The liquor separated from the pulp flows through the screen 8, which separates certain coarse and insoluble substances contained therein, to the receiving or storage tank 9 from which it is recirculated through the pipe 10 by the pump 11 to the grinding roll. When the circulation of the liquor results in a sufficient concentration thereof, it may be withdrawn through the drain pipe 12 to the place of storage or further treatment, and fresh water supplied to the grinder. The liquor thus drawn off may be run to the stills or evaporators or to the fermentation tanks, or to storage tanks for storage or for further treatment.

While but a single grinder is illustrated and the circulation has been likewise illustrated in a conventional and diagrammatic manner, yet it will be understood that this arrangement is but illustrative of the operation of the invention; and that the same or a similar circulation can be effected with a series of grinders, each provided with its own circulatory system, or with a series of grinders interdependent, so that the same liquor may circulate through a common reservoir to the various grinders or over the various grinders in series.

It will thus be seen that the process of the present invention involves the recovery of organic products which are commonly run to waste in the production of mechanical pulp; and that this process involves a recovery of these waste products by recirculation of the liquor, separated from the pulp, over the grinders in successive stages of the grinding operation, until the liquor becomes of sufficient concentration for the recovery of the constituents contained therein. The process thus is a simple and inexpensive process which involves the recovery and utilization of waste products in a highly advantageous manner. It is thus possible, where the liquors commonly run to waste do not contain sufficient valuable constituents to enable their satisfactory recovery to be effected, to so increase the concentration of the liquor that such recovery is made possible in a highly advantageous manner.

In particular, the treatment of steamed wood by grinding and re-circulation of the liquor in the manner above described, with resulting increase in concentration of the valuable organic products; and the treatment of the wood of the western larch, with or without preliminary steaming, for the recovery of galactan and other products therefrom; as well as the subsequent treatment of the liquor with weak acids to hydrolyze the suspended materials and thereby form increased amounts of sugars, which are available, after neutralization of the liquor, for the production of ethyl alcohol; present novel aspects of the invention of particular value in the production and recovery of valuable organic products from the waste water of the wood pulp grinding operation.

Having thus described my invention, what I claim is:

1. The method of recovering organic products from wood, which comprises subjecting the wood to a grinding operation with circulation of water to carry away the wood pulp, separating the water from the pulp, re-circulating the water during further grinding operations to increase the concentration of the organic products therein, and recovering the organic products from the concentrated liquor; substantially as described.

2. The method of recovering organic products from wood, which comprises steaming the wood, subjecting the steamed wood to a grinding operation with circulation of water to carry away the wood pulp, separating the water from the pulp, re-circulating the water during further grinding operations to increase the concentration of the organic products therein, and recovering the organic products from the concentrated liquor; substantially as described.

3. The method of recovering galactan from the wood of the western larch, which comprises subjecting the wood to a grinding operation with circulation of water to carry away the wood-pulp produced, separating the water containing the galactan from the pulp, re-circulating the water during further grinding operations to increase the concentration of the galactan therein, and recovering the galactan from the concentrated liquor; substantially as described.

4. The method of recovering galactan from the wood of the western larch, which comprises steaming the wood, subjecting the steamed wood to a grinding operation with circulation of water to carry away the wood-pulp produced, separating the water containing the galactan from the pulp, re-circulating the water during further grinding operations to increase the concentration of the galactan therein, and recovering the galactan from the concentrated liquor; substantially as described.

5. The method of recovering volatile organic products from wood, which comprises subjecting the wood to a grinding operation with circulation of water to carry away the wood-pulp, separating the water from the pulp, re-circulating the water during further grinding operations to increase the concentration of the organic products therein, and recovering the volatile organic products from the concentrated liquor by distillation; substantially as described.

6. The method of recovering volatile and other organic products from wood, which comprises subjecting the wood to a grinding operation with circulation of water to carry away the wood-pulp, separating the water from the pulp, re-circulating the water during further grinding operations to increase the concentration of the organic products therein and recovering the volatile organic products from the concentrated liquor by distillation with resulting concentration of the unvolatilized products and recovering the unvolatilized products from the thus concentrated liquor, substantially as described.

7. The method of recovering organic products from wood, which comprises subjecting the wood to a grinding operation with circulation of water to carry away the wood pulp, separating the water from the pulp, re-circulating the water during further grinding operations to increase the concentration of the organic products therein, and recovering the organic products from the concentrated liquor by a fermentation operation; substantially as described.

8. The method of recovering organic products from wood, which comprises subjecting the wood to a grinding operation with circulation of water to carry away the pulp produced, separating the water from the pulp, re-circulating the water during further grinding operations to increase the concentration of the fermentable organic products therein, and subjecting the resulting concentrated liquor to an alcoholic fermentation; substantially as described.

9. The method of recovering alcohol from the wood of the western larch, which comprises subjecting the wood to a grinding operation with circulation of water to carry away the pulp produced, separating the water containing the extracted galactan from the pulp, re-circulating the water during further grinding operations to increase the concentration of the galactan therein, and subjecting the resulting concentrated liquor to an alcoholic fermentation; substantially as described.

10. The method of recovering alcohol from the wood of the western larch, which comprises subjecting the wood to a grinding operation with circulation of water to carry away the pulp produced, separating the water containing the extracted galactan from the pulp, re-circulating the water during further grinding operations to increase the concentration of the galactan therein, treating the concentrated liquor to convert the galactan into galactose and subjecting the resulting liquor to an alcoholic fermentation; substantially as described.

11. The method of recovering organic products from wood, which comprises subjecting the wood to a grinding operation with circulation of water to carry away the wood-pulp, separating the water from the pulp, re-circulating the water during further grinding operations to increase the concentration of the organic products therein, treating the resulting concentrated liquor with dilute acid to produce further amounts of sugar therein from suspended or contained constituents, neutralizing the excess acid, and fermenting the neutralized liquor to produce alcohol; substantially as described.

12. The method of recovering alcohol from the wood of the western larch, which comprises subjecting the wood to a grinding operation with circulation of water to carry away the pulp produced, separating the water containing the galactan from the pulp, re-circulating the water during further grinding operations to increase the concentration of the galactan therein, treating the concentrated liquor with dilute acids to produce sugars from the galactan and other constituents therein, neutralizing the excess acid, and subjecting the resulting liquor to an alcoholic fermentation; substantially as described.

In testimony whereof I affix my signature.

HOWARD F. WEISS.